United States Patent
Bloomcamp et al.

(10) Patent No.: US 8,391,458 B1
(45) Date of Patent: Mar. 5, 2013

(54) EMERGENCY CALL PRIORITIZATION

(75) Inventors: Eric Michael Bloomcamp, Olathe, KS (US); Russell E. Huntsman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1179 days.

(21) Appl. No.: 12/233,399

(22) Filed: Sep. 18, 2008

(51) Int. Cl.
H04M 3/42 (2006.01)

(52) U.S. Cl. ......... 379/207.05; 379/207.06; 379/207.07; 379/207.08; 379/45; 379/46; 379/209.01; 455/426.2; 455/69; 455/449

(58) Field of Classification Search .......... 379/48, 379/209.01, 45–46, 207.05–207.08; 455/426.2, 455/69, 449
See application file for complete search history.

(56) References Cited

U.S. PATENT DOCUMENTS

| | | | |
|---|---|---|---|
| 4,779,274 A * | 10/1988 | Takahashi et al. | 714/748 |
| 5,841,848 A * | 11/1998 | Dunn | 379/138 |
| 8,213,590 B1 | 7/2012 | Huntsman et al. | |
| 2005/0070230 A1 | 3/2005 | Das et al. | |
| 2005/0163126 A1 | 7/2005 | Bugenhagen et al. | |
| 2005/0213716 A1 | 9/2005 | Zhu et al. | |
| 2006/0050683 A1 | 3/2006 | Wall et al. | |
| 2007/0206620 A1 | 9/2007 | Cortes et al. | |
| 2007/0298765 A1 | 12/2007 | Dickinson et al. | |

FOREIGN PATENT DOCUMENTS

| | | |
|---|---|---|
| WO | 2005074231 | 8/2005 |
| WO | WO 2005074231 A1 * | 8/2005 |

OTHER PUBLICATIONS

CDW-G, "Zoom 5806 VoIP Telephone Adapter with G.711, iLBC and G.729 Codecs," www.cdwg.com, Mar. 25, 2008, 2 pages, http://www.cdwg.com/shop/products/default.aspx?EDC=1067667.

J. Rosenberg, et al.; "SIP; Session Initiation Protocol;" Network Working Group; Jun. 2002; pp. 1-269; Request for Comments: 3261, Obsoletes: 2543; The Internet Society; http://www.ietf.org/rfc/rfc3261.txt.

* cited by examiner

Primary Examiner — Disler Paul (57) ABSTRACT

A system and method of operating a communication system is described. A communication interface receives a first user request for a voice service from a communication device. In response to receiving the first user request, the communication interface transfers an initial message requesting access to the voice service. The communication interface receives a response to the initial message that indicates that the voice service is not available. After receiving the response, the communication interface receives a second user request from the communication device. A processing system processes the second user request to determine if the second user request indicates an emergency service. If the second user request indicates the emergency service, then the communication interface transfers a call request for the emergency service. If the second user request does not indicate the emergency service, then the communication interface notifies the communication device that the voice service is not available.

20 Claims, 7 Drawing Sheets

EMERGENCY CALL PRIORITIZATION

TECHNICAL BACKGROUND

Many technological advances have resulted in the provisioning and delivery of telephony services over packet networks. In past circuit switched telephony networks, a user may be presented with dial tone played out by the network upon taking a phone off-hook. In packet networks, dial tone is emulated by a device local to the user. Often, the user's modem or other residential system emulates the dial tone previously provided by circuit switched networks. This is necessary because dial tone indicates the availability of telephony services to the user.

When telephony service is not available in a circuit switched network, the user is presented with a fast busy signal from the network indicating that no connections are available for a call. Likewise in a packet network, an emulated fast busy signal may be presented to the user during congestion conditions. However, many emergency service regulations require packet telephony providers to provide the ability to override congestion controls when a caller dials such services. Unfortunately, by emulating a fast busy signal upon a user going off-hook, the user is discouraged from placing the call to an emergency service.

OVERVIEW

A system and method of operating a communication system is described. A communication interface receives a first user request for a voice service from a communication device. In response to receiving the first user request, the communication interface transfers an initial message requesting access to the voice service. The communication interface receives a response to the initial message that indicates that the voice service is not available. After receiving the response, the communication interface receives a second user request from the communication device. A processing system processes the second user request to determine if the second user request indicates an emergency service. If the second user request indicates the emergency service, then the communication interface transfers a call request for the emergency service. If the second user request does not indicate the emergency service, then the communication interface notifies the communication device that the voice service is not available.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
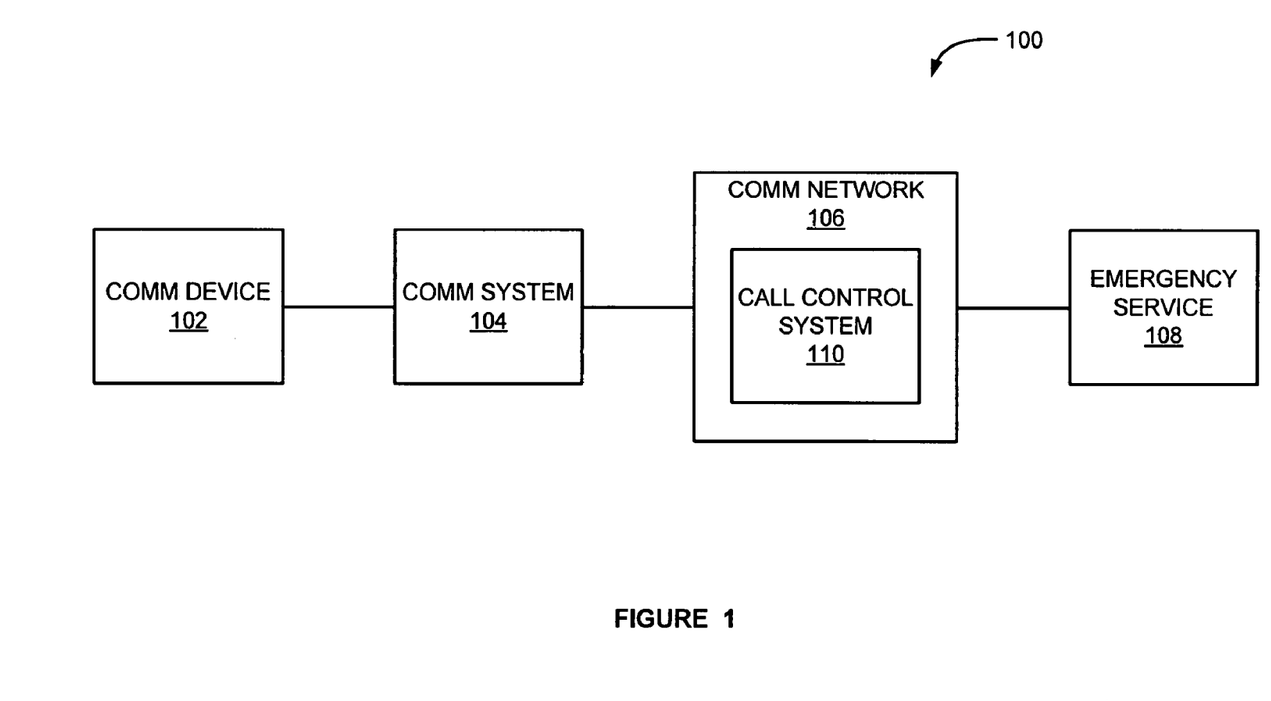
FIG. 1 is a block diagram that illustrates a communication system in a communication environment.

FIG. 1 is a block diagram that illustrates communication system 104 in communication environment 100. Communication environment 100 comprises communication device 102, communication system 104, communication network 106, and emergency service 108. Communication network 106 comprises call control system 110. Communication network 106 is in communication with communication system 104 and emergency service 108. Communication device 102 is in communication with communication system 104.

Communication device 102 is capable of transmitting and receiving voice data. Communication device 102 comprises hardware and circuitry programmed to function as a telecommunications device. For example, communication device 102 comprises a telephone, a wireless telephone, an Internet appliance, a personal digital assistant, a computer, or any other telecommunications device. Communication device 102 may be distributed among multiple devices that together comprise element 102.

Communication device 102 is connected to communication system 104. The link between communication device 102 and communication system 104 may be either a wired or wireless connection.

Communication system 104 is capable of providing a gateway function between communication device 102 and communication network 106. Communication system 104 comprises hardware and circuitry programmed to provide a connection between a communication device and a communication network.

For example, communication system 104 could provide a wired connection, such as a terminal adapter, an embedded Multimedia Terminal Adapter (eMTA), a Voice over Internet Protocol (VoIP) residential gateway, a Data Over Cable Service Interface Specification (DOCSIS) compliant modem, a Digital Subscriber Line (DSL) modem, or an Integrated Services Digital Network (ISDN) modem. Additionally, communication system 104 could comprise a Fiber Optic Modem (FOM), an Optical Network Terminal (ONT), a High-Speed Uplink Packet Access (HSUPA) modem, a High-Speed Downlink Packet Access (HSDPA) modem, a broadband modem, a router, an adapter, or any device that provides a gateway function between a communication network and a communication device.

Communication system 104 could also provide a wireless connection, such as a Worldwide Interoperability for Microwave Access (WiMAX) modem, an Evolution-Data Optimized (EVDO) modem, a Fourth-Generation (4G) modem, a Very Small Aperture Terminal (VSAT) two-way satellite ground station, a cellular modem, or any device that wirelessly provides a gateway function between a communication network and a communication device.

Communication system 104 could transmit and receive utilizing any number of wireless technologies including, but not limited to, Code Division Multiple Access (CDMA) 1xRTT, Global System for Mobile communications (GSM), High-Speed Packet Access (HSPA), EVDO, EVDO rev. A, WiMAX, and the like. Further, communication system 104 may include the ability to transmit and receive over a single wireless protocol or multiple wireless protocols and may have the ability to simultaneously utilize multiple protocols.

Communication system 104 may be distributed among multiple devices that together comprise element 104. For example, communication system 104 could comprise a VoIP terminal adapter and a broadband modem. Additionally or alternatively, communication system 104 may comprise a single device, such as an eMTA, wherein a terminal adapter is embedded in a broadband modem.

Communication system 104 is connected to communication network 106. The link between communication system 104 and communication network 106 may be either a wired or wireless connection. Communication system 104 provides a gateway function between communication device 102 and communication network 106.

Communication network 106 is capable of providing a communication service to communication device 102 or communication system 104. For example, communication network 106 could comprise a packet-switched network, such as the Internet, a public switched telephone network (PSTN), a PacketCable network, an asynchronous transfer mode (ATM) network, a personal communication service (PCS) network, a local area network (LAN), a wide area network (WAN), a VoIP network, or any other network that provides a communication service to communication device 102 or communication system 104. Moreover, communication network 106 could comprise any of the public switched data networks (PSDNs) such as an Internet Protocol network (Internet), Frame Relay, General Packet Radio Service (GPRS), Ethernet, and others.

Communication network 106 comprises call control system 110. Communication network 106 is in communication with communication system 104 and emergency service 108.

Call control system 110 comprises hardware and circuitry capable of exerting influence over the data streams that make up a call session. Call control system 110 could comprise a session border controller or any other device that exerts control over signaling and media streams involved in setting up, conducting, and tearing down calls. For example, call control system 110 can modify the stream of signaling data involved in each call, perhaps limiting the kinds of calls that can be conducted, or changing the codec of encoded audio packets. Call control system 110 manages communication traffic between communication system 104 and emergency service 108.

Emergency service 108 comprises a police service, a fire service, an emergency medical service, or any other type of emergency care service that may be summoned by telephone. In one example, emergency service 108 comprises any emergency service that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number.

Figure 2:
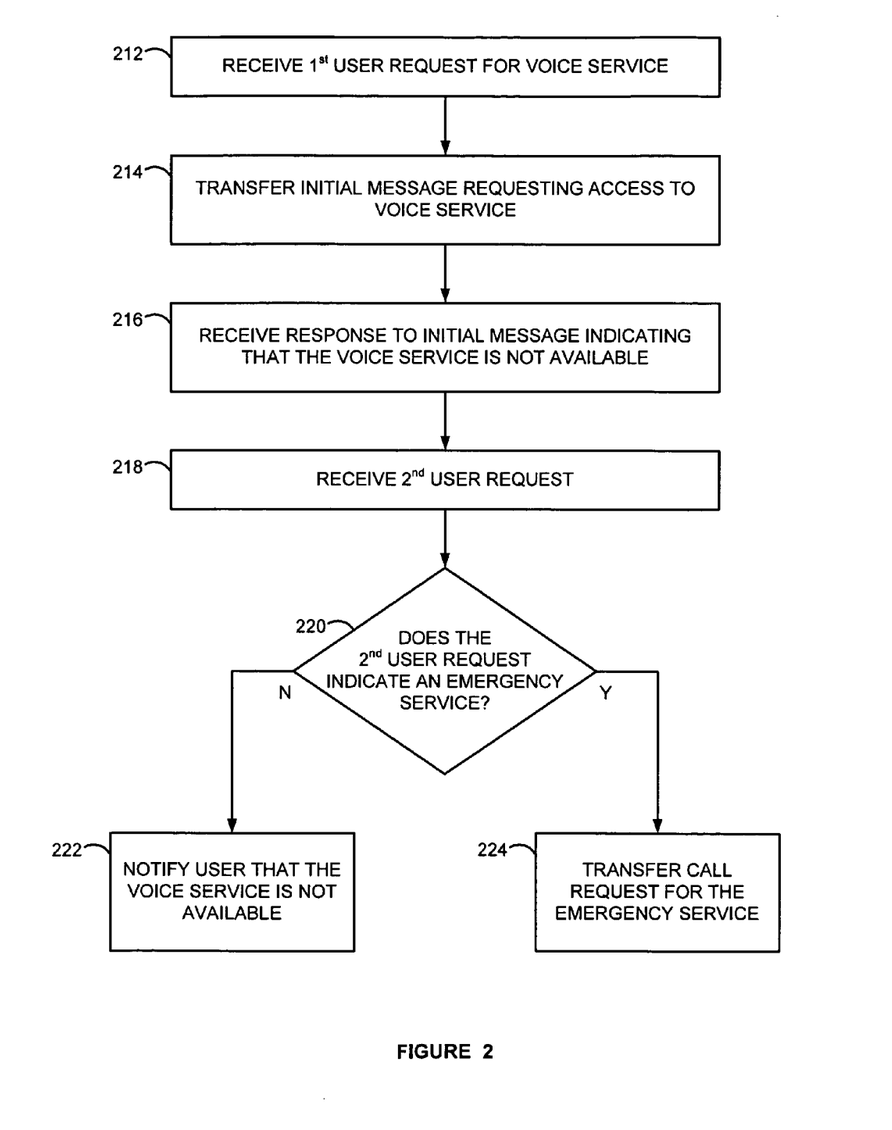
FIG. 2 is a flow diagram that illustrates a method of operating a communication system.

FIG. 2 is a flow diagram that illustrates a method of operating communication system 104. Communication system 104 receives a first user request for a voice service from communication device 102 (operation 212). The first user request comprises a user enabling a data transmission for a communication link in communication device 102. This is also referred to as communication device 102 going off-hook.

In response to receiving the first user request, communication device 102 transfers an initial message requesting access to the voice service (operation 214). The initial message comprises an off-hook notify or some other message that requests access to the voice service. In one embodiment, transferring the initial message requesting access to the voice service includes transferring an off-hook notify from communication system 104 to communication network 106. In another embodiment, transferring the initial message requesting access to the voice service includes transferring an off-hook notify from communication system 104 to call control system 110.

In the event communication network 106 or call control system 110 is unable to service the call, communication system 104 receives a response indicating that the voice service is not available (operation 216). The response comprises a Negative Acknowledgement (NACK) or some other message that indicates that the voice service is not available. In one example, communication system 104 receives a NACK or similar message from communication network 106 indicating that the voice service is not available due to network congestion. In another example, communication system 104 receives a NACK or similar message from call control system 110 indicating that the voice service is not available due to network congestion.

Despite receiving a NACK or similar message, communication system 104 plays a dial tone sound to communication device 102, indicating that communication system 104 is ready to accept dialed digits. Communication device 102 transfers a second user request to communication system 104 (operation 218). The second user request comprises dialed digits from communication device 102. In one embodiment, the dialed digits are equal to 9-1-1. In another embodiment, the dialed digits do not indicate a request for emergency service.

Communication system 104 then processes the second user request to determine if the second user request indicates an emergency service (operation 220). The second user request indicates an emergency service if the dialed digits are equal to a predetermined emergency telephone number. In one example, processing the second user request to determine if the second user request indicates the emergency service includes processing the second user request to determine if the dialed digits are equal to 9-1-1.

If the second user request does not indicate the emergency service, then communication system 104 notifies communication device 102 that the voice service is not available (operation 222). In one example, communication system 104 notifies a user that the voice service is not available by transferring a busy signal or a communication failure message to communication device 102.

However, if the second user request indicates a request for an emergency service, then communication system 104 transfers a call request for the emergency service (operation 224). In one embodiment, Communication system 104 is allowed to transfer the call request even when communication network 106 or call control system 110 is in a congested state.

The call request for the emergency service could be signaled to communication network 106 in a variety of ways. One such method of signaling a request for emergency service comprises transferring an out-of-sequence notify for the emergency service to communication network 106. An out-of-sequence notify informs communication network 106 or call control system 110 of an emergency request by demanding service outside of the typical sequence for servicing calls.

For example, when communication system 104 determines that the dialed digits comprise an emergency number, for example 9-1-1, then communication system 104 transfers an out-of-sequence notify for the emergency service to call control system 110. Call control system 110 receives the call request for the emergency service. Call control system 110 then processes the call request to determine that the call request is an out-of-sequence notify for the emergency service.

In response to determining that the call request is an out-of-sequence notify for the emergency service, call control system 110 transfers the out-of-sequence notify for the emergency service to communication network 106. In another embodiment, in response to determining that the call request is an out-of-sequence notify for the emergency service, call control system 110 and communication system 104 simply connect communication device 102 to emergency service 108.

In response to receiving an out-of-sequence notify for the emergency service from call control system 110, communication network 106 sends a message to call control system 110 indicating readiness to accept the call request. In one embodiment, communication network 106 or call control system 110 free up enough resources to service the call request for emergency service by issuing NACK or similar messages to other pending, non-emergency call requests.

In response to receiving a message indicating readiness to accept the call request, call control system 110 then transfers the call request for the emergency service to communication network 106 and a connection between emergency service 108 and communication device 102 is established.

Another possible method of signaling a request for emergency service comprises including a priority bit in the call request for the emergency service. The priority bit is detected by communication network 106 or call control system 110 and the call request for the emergency service is given the highest priority of all pending call requests. A call request for emergency service given the highest priority from communication network 106 or call control system 110 could be serviced before any other call request. In addition, communication network 106 or call control system 110 could free up enough resources to handle the prioritized call request for emergency service by issuing a NACK code or similar message to other pending, non-emergency calls.

For example, when communication system 104 determines that the dialed digits comprise an emergency number, for example 9-1-1, then communication system 104 transfers the call request comprising a priority bit to call control system 110. Call control system 110 detects the priority bit in the call request that indicates that the dialed digits are equal to 9-1-1. In response to detecting the priority bit that indicates that the dialed digits are 9-1-1, call control system 100 transfers an off-hook notify to the communication server to establish the proper call state with the communication server.

In one embodiment, call control system 110 establishes the proper call state with the communication server by transferring an off-hook notify to communication network 106. Communication network 106 then replies by sending a message indicating readiness to service the call request to call control system 110. In response to receiving a message indicating readiness to accept the call request, call control system 110 then transfers the call request for the emergency service to communication network 106 and a connection between emergency service 108 and communication device 102 is established.

In another example, in response to transferring the call request for the emergency service, communication system 104 receives a successful response from call control system 110. Communication system 104 then connects communication device 102 to emergency service 108.

Figure 3:
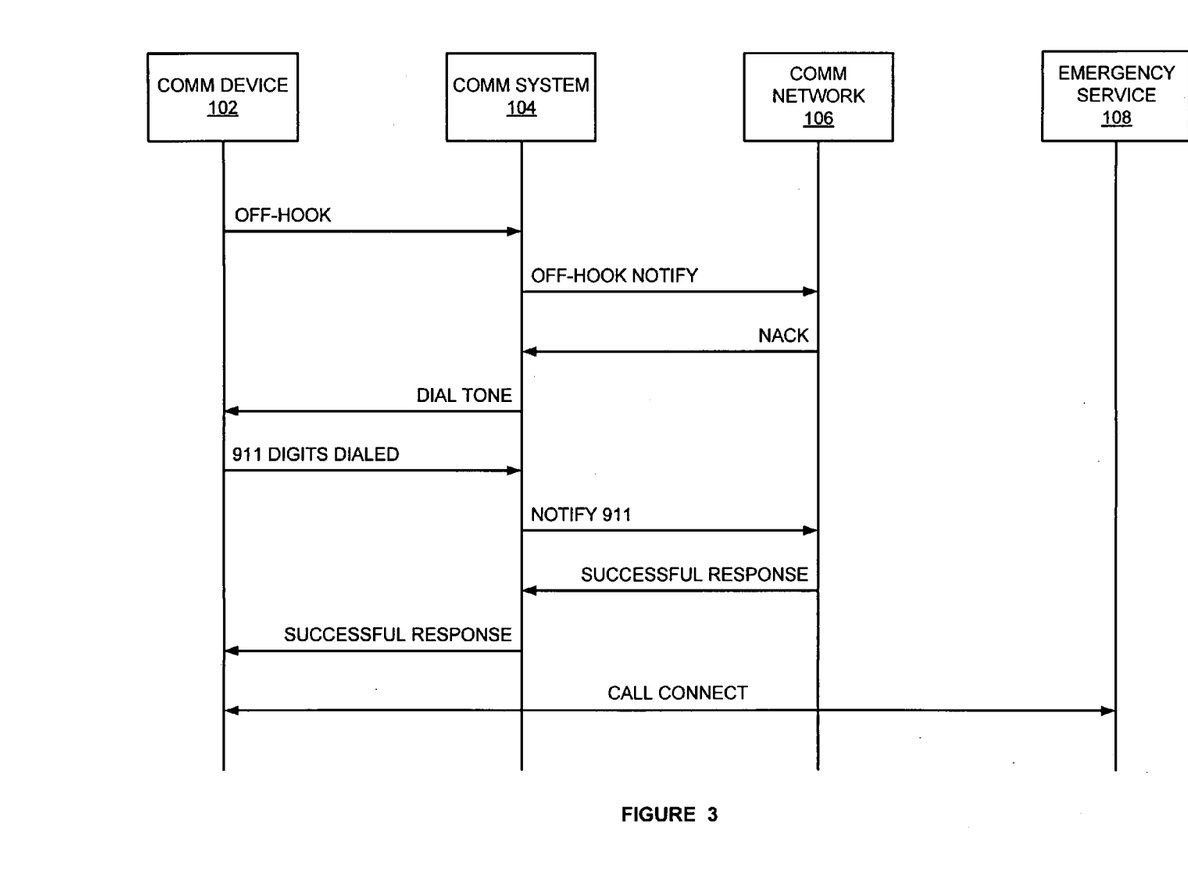
FIG. 3 is a sequence diagram that illustrates a method of operating a communication system.

FIG. 3 is a sequence diagram that illustrates a method of operating communication environment 100. A user desiring to place an emergency call using communication device 102 of communication environment 100 would benefit from employing the method of FIG. 3.

When a user picks up or activates communication device 102, in an attempt to receive a dial tone, communication device 102 transfers an off-hook message to communication system 104. Communication system 104 then transfers an off-hook notify to communication network 106. In response to receiving the off-hook notify, communication network 106 transfers a NACK to communication system 104 due to network congestion. Despite receiving a NACK from communication network 106, communication system 104 transfers a dial tone to communication device 102.

A user at communication device 102 indicates a 9-1-1 call for an emergency service. The user indicates a 9-1-1 call by inputting a series of numbers, a voice command, or through some other user interface element. Communication device 102 translates the 9-1-1 indication into dialed digits. Communication device 102 transfers the dialed digits to communication system 104. Communication system 104 then transfers an out-of-sequence notify for the emergency service to communication network 106. Communication network 106 receives the out-of-sequence notify for the emergency service and transfers a successful response to communication system 104. Communication system 104 transfers the successful response to communication device 102. Communication system 104 and communication network 106 then connect a call between communication device 102 and emergency service 108.

Figure 4:
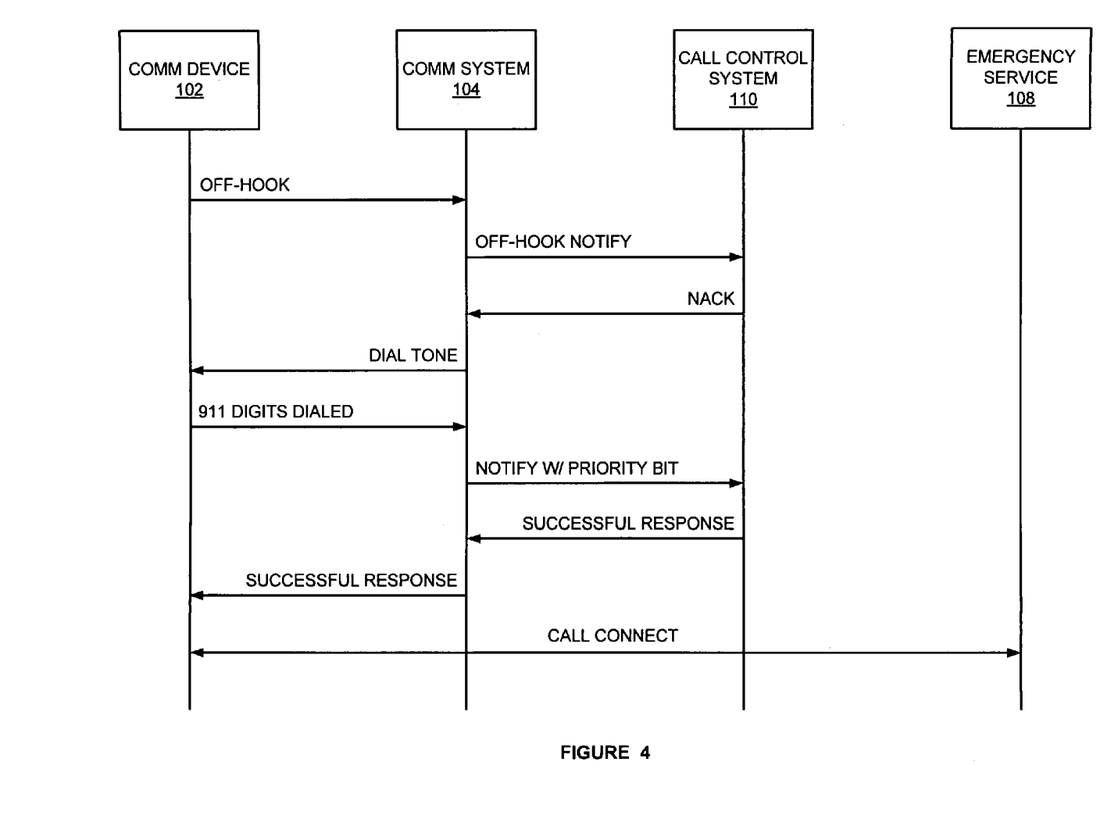
FIG. 4 is a sequence diagram that illustrates a method of operating a communication system.

FIG. 4 is a sequence diagram that illustrates a method of operating communication environment 100. A user desiring to place an emergency call using communication device 102 of communication environment 100 would benefit from employing the method of FIG. 4.

When a user picks up or activates communication device 102, in an attempt to receive a dial tone, communication device 102 transfers an off-hook message to communication system 104. Communication system 104 then transfers an off-hook notify to call control system 110. In response to receiving the off-hook notify, call control system 110 transfers a NACK to communication system 104 due to network congestion. Despite receiving a NACK from call control system 110, communication system 104 transfers a dial tone to communication device 102.

A user at communication device 102 indicates a call for an emergency service, for example, by dialing 9-1-1. Communication device 102 transfers the dialed digits to communication system 104. Communication system 104 then transfers a call request with a priority bit for the emergency service to call control system 110. Call control system 110 receives the call request with the priority bit for the emergency service and transfers a successful response to communication system 104. Communication system 104 transfers the successful response to communication device 102. Communication system 104 and call control system 110 then connect a call between communication device 102 and emergency service 108.

Figure 5:
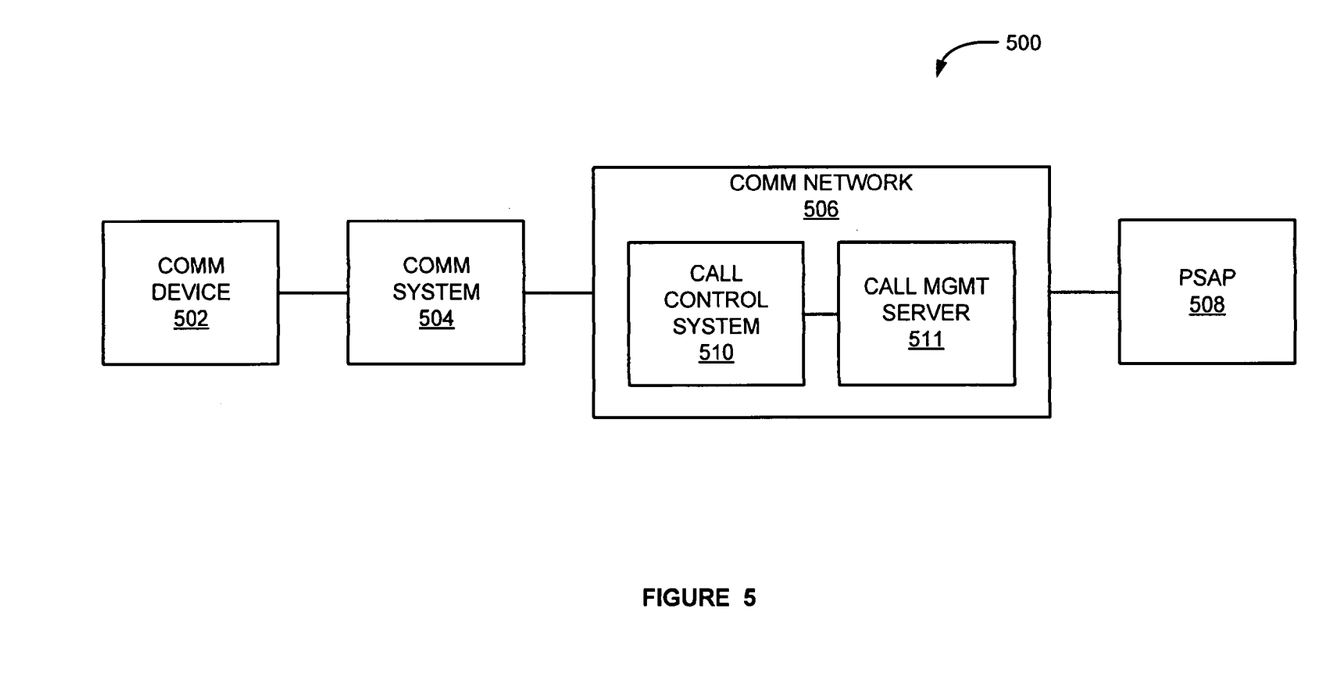
FIG. 5 is a block diagram that illustrates a communication environment.

FIG. 5 is a block diagram that illustrates communication environment 500. Communication environment 500 comprises communication device 502, communication system 504, communication network 506, and emergency service Public Safety Answering Point (PSAP) 508. Communication network 506 comprises call control system 510 and call management server 511. Communication network 506 is in communication with PSAP 508 and communication system 504. Communication device 502 is in communication with communication system 504. Call control system 510 is in communication with call management server 511.

Call control system 510 comprises hardware and circuitry capable of exerting influence over the data streams that make up a call session. Call control system 510 could comprise a session border controller or any other device that exerts control over signaling and media streams involved in setting up, conducting, and tearing down calls. Call control system 510 manages communication traffic between communication system 504 and call management server 511.

Call management server 511 comprises any device that sends and receives messages to and from a terminal adapter, such as an eMTA, or a session border controller to control call setup and tear down.

PSAP 508 comprises any entity responsible for answering calls requesting emergency assistance from an emergency service. For example, an emergency service comprises police, fire, or ambulance services.

Figure 6:
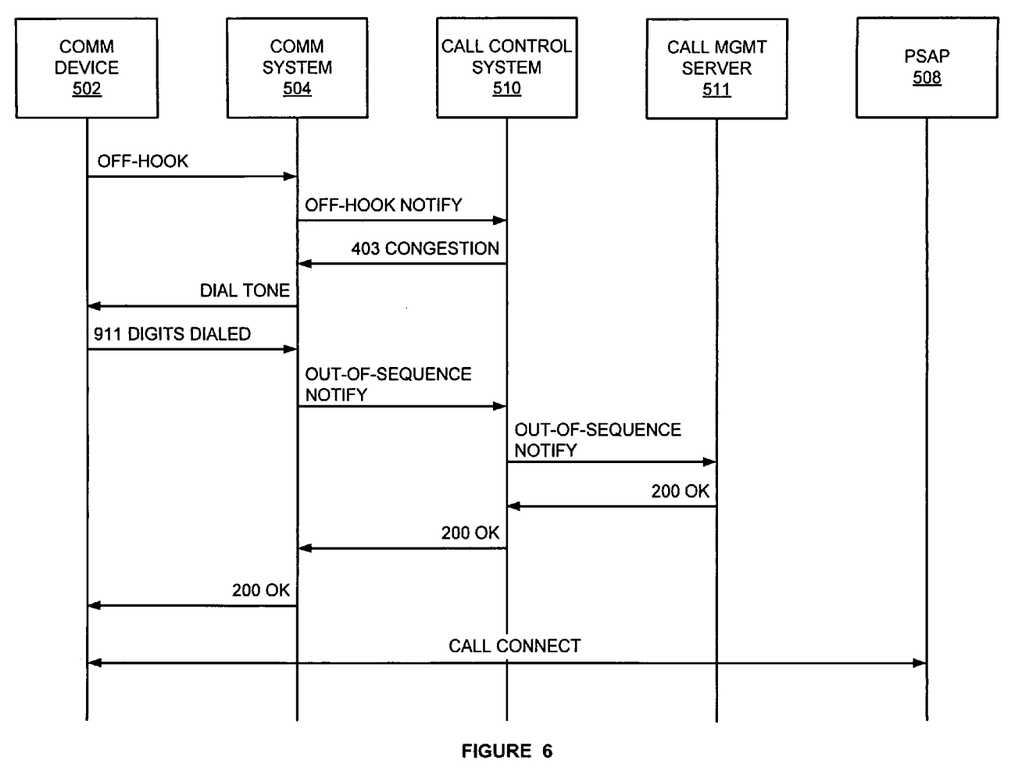
FIG. 6 is a sequence diagram that illustrates a method of operating a communication environment.

FIG. 6 is a sequence diagram that illustrates a method of operating communication environment 500. A user desiring to place an emergency call using communication device 502 of communication environment 500 would benefit from employing the method of FIG. 6.

When a user picks up or activates communication device 502, in an attempt to receive a dial tone, communication device 502 transfers an off-hook notification to communication system 504. Communication system 504 transfers an off-hook notify to call control system 510. Call control system 510 responds to communication system 504 with a 403 congestion code indicating network congestion. Despite receiving a 403 congestion code from call control system 510, communication system 504 transfers a dial tone to communication device 502.

A user at communication device 502 indicates a call request for an emergency service, for example by dialing 9-1-1. Communication device 502 transfers the dialed digits to communication system 504. Communication system 504 then transfers an out-of-sequence notify for the emergency service to call control system 510. Communication system 504 is allowed to transfer the call request even when communication network 506, call control system 510, or communication system 504 is in a congested state. Call control system 510 receives the out-of-sequence notify for the emergency service and determines that the out-of-sequence notify indicates a 9-1-1 call. Call control system 510 transfers the out-of-sequence notify to call management server 511. Call management server 511 returns a 200 OK code to call control system 510. Call control system 510 transmits the 200 OK code to communication system 504. Communication system 504 transfers the 200 OK code to communication device 502. Communication system 504, call control system 510, and call management server 511 then connect a call between communication device 502 and PSAP 508.

Figure 7:
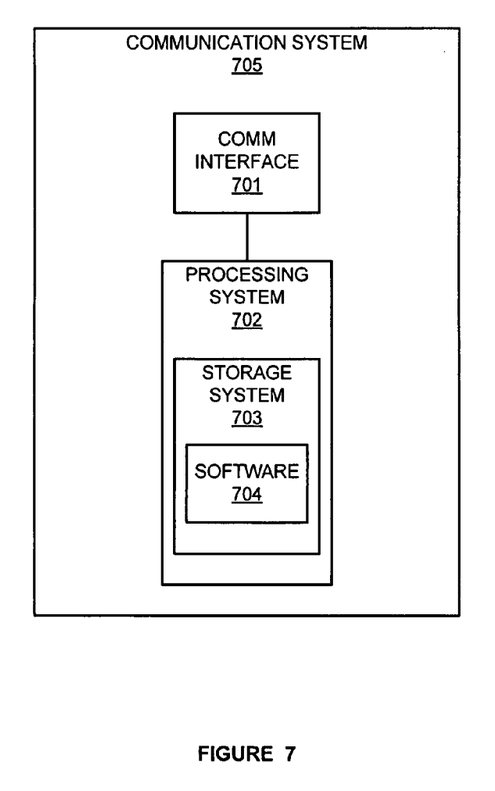
FIG. 7 is a block diagram that illustrates a communication system.

FIG. 7 is a block diagram that illustrates communication system 705. Communication system 705 includes communication interface 701 and processing system 702. Processing system 702 includes storage system 703. Storage system 703 stores software 704. Processing system 702 is linked to communication interface 701. Communication system 705 could be comprised of a programmed general-purpose computer, although those skilled in the art will appreciate that programmable or special purpose circuitry and equipment may be used. Communication system 705 may be distributed among multiple devices that together comprise elements 701, 702, 703, and 704.

Communication interface 701 comprises a network interface, modem, port, transceiver, or some other communication element. Communication interface 701 may be distributed among multiple devices. Processing system 702 could comprise a computer microprocessor, logic circuit, or some other processing device. Processing system 702 may be distributed among multiple devices. Storage system 703 could comprise a disk, integrated circuit, solid-state drive, server, or some other memory device. Storage system 703 may be distributed among multiple memory devices.

Processing system 702 retrieves and executes software 704 from storage system 703. Software 704 may comprise an operating system, utilities, drivers, networking software, and other software typically loaded onto a computer system. Software 704 could comprise an application program, firmware, or some other form of machine-readable processing instructions. When executed by processing system 702, software 704 directs processing system 702 to operate as described herein.

Communication interface 701 receives a first user request from a communication device for a voice service, wherein the first user request comprises an off-hook message. In response to receiving the first user request, communication interface 701 transfers an initial message requesting access to the voice service, wherein the initial message comprises an off-hook notify. Communication interface 701 receives a response to the initial message indicating that the voice service is not available, wherein the response comprises a NACK or a 403 congestion code.

After receiving the response, communication interface 701 receives a second user request from the communication device, wherein the second user request comprises dialed digits. Processing system 702 processes the second user request to determine if the second user request indicates an emergency service. For example, processing system 702 processes the second user request to determine if the dialed digits are equal to 9-1-1.

If the second user request does not indicate the emergency service, then communication interface 701 transfers a notification to the communication device that indicates that the voice service is not available, wherein the notification comprises a busy tone or a call failure message, for example.

If the second user request indicates the emergency service, the communication interface 701 transfers a call request for the emergency service, wherein the call request comprises an out-of-sequence notify or a priority bit.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a first user request from a communication device for a voice service;
   in response to receiving the first user request, transferring an initial message requesting access to the voice service;
   receiving a response to the initial message that indicates that the voice service is not available;
   after receiving the response, receiving a second user request from the communication device;
   processing the second user request to determine if the second user request indicates an emergency service;

if the second user request indicates the emergency service, then transferring a call request for the emergency service, wherein the call request comprises an out-of-sequence notification message that indicates a high priority of the call request; and if the second user request does not indicate the emergency service, then notifying the communication device that the voice service is not available.

2. The method of claim 1 wherein the first user request comprises, in the communication device, enabling a data transmission for a communication link.

3. The method of claim 1 wherein transferring the initial message requesting access to the voice service comprises transferring an off-hook notify.

4. The method of claim 1 wherein receiving the second user request comprises receiving dialed digits from the communication device.

5. The method of claim 4 wherein processing the second user request to determine if the second user request indicates the emergency service comprises processing the second user request to determine if the dialed digits are equal to 9-1-1.

6. The method of claim 1 wherein receiving the response to the initial message comprises receiving a Negative Acknowledgement (NACK) from a call control system due to network congestion.

7. The method of claim 6 further comprising:
in the call control system, receiving the call request, processing the call request to determine that the call request comprises the out-of-sequence notification message that indicates the high priority of the call request, and transferring the call request to a communication server.

8. The method of claim 1 wherein transferring the call request for the emergency service comprises transferring a call request comprising a priority bit.

9. The method of claim 8 wherein the priority bit indicates that the dialed digits are equal to 9-1-1.

10. The method of claim 1 further comprising:
in response to transferring the call request for the emergency service, receiving a successful response from a call control system; and
connecting the communication device to an emergency service.

11. A communication system comprising:
a communication interface configured to:
receive a first user request from a communication device for a voice service;
in response to receiving the first user request, transfer an initial message requesting access to the voice service;
receive a response to the initial message that indicates that the voice service is not available;
after receiving the response, receive a second user request from the communication device; and,
a processing system configured to:
process the second user request to determine if the second user request indicates an emergency service;
if the second user request indicates the emergency service, then the communication interface configured to transfer a call request for the emergency service, wherein the call request comprises an out-of-sequence notification message that indicates a high priority of the call request; and
if the second user request does not indicate the emergency service, then the communication interface configured to notify the communication device that the voice service is not available.

12. The system of claim 11 wherein the first user request comprises, in the communication device, the enablement of a data transmission for a communication link.

13. The system of claim 11 wherein the initial message requesting access to the voice service comprises an off-hook notify.

14. The system of claim 11 wherein the second user request comprises dialed digits from the communication device.

15. The system of claim 14 wherein the dialed digits are equal to 9-1-1.

16. The system of claim 11 wherein the response to the initial message comprises a Negative Acknowledgement (NACK) from a call control system due to network congestion.

17. The system of claim 16 further comprising:
the call control system configured to receive the call request, process the call request to determine that the call request comprises the out-of-sequence notification message that indicates the high priority of the call request, and transfer the call request to a communication server.

18. The system of claim 11 wherein the call request for the emergency service comprises a priority bit.

19. The system of claim 18 wherein the priority bit indicates that the dialed digits are equal to 9-1-1.

20. The system of claim 11 further comprising:
in response to transferring the call request for the emergency service, the communication interface configured to receive a successful response from a call control system; and
the processing system configured to connect the communication device to an emergency service.

* * * * *